United States Patent
Norin

(10) Patent No.: US 10,045,083 B2
(45) Date of Patent: Aug. 7, 2018

(54) SATELLITE SEEDING OF A PEER-TO-PEER CONTENT DISTRIBUTION NETWORK

(75) Inventor: John L. Norin, Redondo Beach, CA (US)

(73) Assignee: THE DIRECTV GROUP, INC., El Segundo, CA (US)

(*) Notice: Subject to any disclaimer, the term of this patent is extended or adjusted under 35 U.S.C. 154(b) by 1550 days.

(21) Appl. No.: 12/502,185

(22) Filed: Jul. 13, 2009

(65) Prior Publication Data

US 2018/0176649 A1 Jun. 21, 2018

(51) Int. Cl.
  *H04N 7/173* (2011.01)
  *H04N 21/472* (2011.01)

(52) U.S. Cl.
  CPC ............... *H04N 21/47202* (2013.01)

(58) Field of Classification Search
  CPC .................................... H04N 21/47202
  See application file for complete search history.

(56) References Cited

U.S. PATENT DOCUMENTS

| | | | |
|---|---|---|---|
| 5,594,491 A | 1/1997 | Hodge et al. | |
| 5,742,757 A | 4/1998 | Hamadani et al. | |
| 5,867,155 A | 2/1999 | Williams | |
| 7,017,174 B1* | 3/2006 | Sheedy | 725/87 |
| 7,251,255 B1* | 7/2007 | Young | 370/468 |
| 7,577,721 B1 | 8/2009 | Chen | |
| 7,584,285 B2 | 9/2009 | Hudson et al. | |
| 7,797,722 B2 | 9/2010 | Lin et al. | |
| 2002/0046405 A1 | 4/2002 | Lahr | |
| 2002/0056118 A1 | 5/2002 | Hunter et al. | |
| 2002/0124099 A1* | 9/2002 | Srinivasan et al. | 709/231 |
| 2003/0012554 A1* | 1/2003 | Zeidler et al. | 386/83 |
| 2003/0086023 A1* | 5/2003 | Chung et al. | 348/714 |
| 2003/0093806 A1* | 5/2003 | Dureau | H04N 7/088 725/107 |
| 2003/0121047 A1 | 6/2003 | Watson et al. | |
| 2003/0237097 A1 | 12/2003 | Marshall et al. | |
| 2004/0088731 A1* | 5/2004 | Putterman et al. | 725/94 |
| 2004/0101271 A1* | 5/2004 | Boston et al. | 386/46 |
| 2004/0117847 A1* | 6/2004 | Karaoguz et al. | 725/134 |
| 2004/0167857 A1 | 8/2004 | Baker et al. | |
| 2005/0138659 A1* | 6/2005 | Boccon-Gibod et al. | 725/58 |
| 2005/0146990 A1* | 7/2005 | Mayer | 368/95 |

(Continued)

FOREIGN PATENT DOCUMENTS

EP 0965223 B1 7/2005

OTHER PUBLICATIONS

Locher, et al., Push-to-Pull Peer-to-Peer Live Streaming, A. Pelc (Ed.): Disc 2007, LNCS 4731, pp. 388-402, 2007. © Springer-Verlag Berlin Heidelberg 2007.

(Continued)

*Primary Examiner* — Joshua Taylor
(74) *Attorney, Agent, or Firm* — Gates & Cooper LLP

(57) ABSTRACT

Systems and methods for combining a satellite broadcast system with a network. A system in accordance with one or more embodiments of the present invention comprises a plurality of satellite receivers, wherein each of the satellite receivers is coupled to both the satellite broadcast system and the network, wherein a first receiver in the plurality of satellite receivers receives data from at least a second receiver in the plurality of receivers via the network.

14 Claims, 6 Drawing Sheets

(56) References Cited

U.S. PATENT DOCUMENTS

| | | |
|---|---|---|
| 2006/0050736 A1 | 3/2006 | Segel |
| 2006/0064386 A1* | 3/2006 | Marking |
| 2006/0130106 A1* | 6/2006 | Iwata et al. ............... 725/105 |
| 2006/0156357 A1* | 7/2006 | Lockridge et al. ........... 725/90 |
| 2006/0218620 A1 | 9/2006 | Nadarajah et al. |
| 2006/0294555 A1 | 12/2006 | Xie |
| 2007/0101375 A1* | 5/2007 | Haberman ................. 725/86 |
| 2007/0124769 A1* | 5/2007 | Casey ................. H04H 20/10 |
| | | 725/46 |
| 2007/0136753 A1* | 6/2007 | Bovenschulte ....... H04H 60/31 |
| | | 725/46 |
| 2007/0245397 A1 | 10/2007 | James et al. |
| 2008/0040420 A1 | 2/2008 | Twiss et al. |
| 2008/0066112 A1* | 3/2008 | Bailey et al. ............... 725/58 |
| 2008/0097967 A1 | 4/2008 | Milbrandt et al. |
| 2008/0205291 A1 | 8/2008 | Li et al. |
| 2009/0083812 A1 | 3/2009 | Tang |
| 2009/0094453 A1 | 4/2009 | Bradley et al. |
| 2009/0119715 A1* | 5/2009 | Schwesinger et al. ......... 725/58 |
| 2009/0168679 A1* | 7/2009 | Benjamim ............ H04H 20/26 |
| | | 370/312 |
| 2010/0142543 A1 | 6/2010 | Shaikh et al. |

OTHER PUBLICATIONS

Mexican Office action dated Feb. 22, 2013 in Mexican Patent Application No. MX/a/2010/007639 filed Jul. 12, 2010 by John L. Norin.

Argentine Office action dated Aug. 22, 2014 in Argentine Patent Application No. 2010 01 02538 filed Jul. 13, 2010 by John L. Norin.

* cited by examiner

Assumptions

| | |
|---|---|
| Movie Length | 120 minutes |
| SD Movie | 1.4 Mbps |
| HD Movie | 5.5 Mbps |

| DEMAND | SD | HD | Total | Volume, GB | Carousel, hrs | Rate, Mbps |
|---|---|---|---|---|---|---|
| Carousel | 0 | 25 | 25 | 121 | 84 | 3 |
| Push (2 copy/7 days) | 100 | 50 | 150 | 365 | 24 | 35 |
| 24 hour (1 copy/24 hour) | 575 | 125 | 700 | 1312 | 48 | 62 |
| 48 hour (1 copy/48 hour) | 1300 | 300 | 1600 | 3050 | 96 | 72 |
| 96 hour (1 copy/96 hour) | | | | | | |
| Totals | 1975 | 500 | 2475 | 4847 | | 172 |

| Peer-to-peer seeding | SD | HD | Total | Volume, GB | Carousel, hrs | Rate, Mbps |
|---|---|---|---|---|---|---|
| 30 day (1 copy/30 day) | 3000 | 500 | 3500 | 6108 | 720 | 19 |

| HDD Utilization | SD | HD | Total | Volume, GB | Initial seeds | Initial BB |
|---|---|---|---|---|---|---|
| Category | | | | | Per title | Seeds |
| Pushed Content | 0 | 25 | 25 | 121 | 50 | 20000 |
| Peer-to-peer Seeding | n/a | n/a | n/a | 15 | | |
| Top 10 queued items | 10 | 10 | 20 | 61 | | |
| Total Network HDD req'd | | | | 197 | | |

FIG. 4

SATELLITE SEEDING OF A PEER-TO-PEER CONTENT DISTRIBUTION NETWORK

BACKGROUND OF THE INVENTION

1. Field of the Invention

The present invention relates generally to satellite video systems, and in particular, to a method and apparatus for satellite seeding of a peer-to-peer content distribution network.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114. Cable 122 can be a standard television cable, an internet connection, a broadband connection, or any combination of one or more data connections to IRD 112.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to the home, users will like and expect these additional services to be delivered at reasonable cost. Viewers and users of services, e.g., wireless networking, internet services, etc., will like and expect to have access to these services and integrate these services with other services, e.g., wireless telephone communications, etc.

FIG. 2 illustrates a typical IRD of the related art.

IRD 112 typically has an input from downlink 120, and processes the input from downlink 120 as necessary to produce a visible and audible image on monitor 114. Further, other signals can be input to IRD 112, such as cable 122, and broadband internet connection 200, which allow additional inputs and outputs to IRD 112. In many cases, IRD 112 can contain or can otherwise be connected to a Digital Video Recorder (DVR) 202, such that information from any of the inputs 120, 122, Or 200 can be recorded on DVR 202.

Remote control 204 is also typically used to control features and operation of IRD 112. For example, remote control 204 can change which viewer channel is being displayed on monitor 114, which essentially commands IRD 112 which downlink 120 signal, cable 122 signal, or broadband internet connection 200 signal, or whether a playback of previously recorded information on DVR 202, is desired by the viewer to be seen on monitor 114.

Remote control 204 can also be used to control additional access to IRD 112. For example, when IRD 112 is coupled to the service provider authorization center via broadband internet connection 200 (or a standard telephone line, or via cable 122, or via other backchannel connections as needed), then a viewer can order a pay-per-view movie, additional channels, or other services that require the service provider to send commands to IRD 112 authorizing access to that content. Some of this content may be delivered via satellites 102-106, and portions of the content may also be delivered via broadband internet connection 200 or cable 122. Further, content may be delivered without viewer request, which is known as a "push" of data to an IRD 112. Data delivered to IRD 112 in any or all of these scenarios may also be recorded on DVR 202. Internet connection 200 is also used for programming IRD 112 and/or DVR 202 from other locations, such as via the internet or from a cellular telephone.

However, delivery of data, even with satellite 102-106 bandwidths and broadband 200 bandwidths, takes time. Further, the varied types and selections of content, e.g., current movies, older movies, current and past episodes of television shows, etc., provides more data than can be delivered at any given time.

It can be seen, then, that there is a need in the art for a satellite broadcast system that can be expanded. It can also be seen that there is a need in the art for a satellite broadcast system that can deliver additional information to each subscriber as needed or requested.

SUMMARY OF THE INVENTION

To minimize the limitations in the prior art, and to minimize other limitations that will become apparent upon reading and understanding the present specification, the present invention comprises systems and methods for combining a satellite broadcast system with a network. A system in accordance with one or more embodiments of the present invention comprises a plurality of satellite receivers, wherein each of the satellite receivers is coupled to both the satellite broadcast system and the network, wherein a first receiver in the plurality of satellite receivers receives data from a second receiver in the plurality of receivers via the network.

Such a system further optionally comprises the network being a broadband network, the second receiver in the plurality of satellite receivers comprising a recorder, the first receiver in the plurality of satellite receivers comprising a recorder, the first receiver in the plurality of satellite receivers recording the data received from the second receiver, the first receiver in the plurality of satellite receivers further receiving additional data from at least a third receiver in the plurality of receivers via the network, the data and the additional data being portions of a single data program, a subset of the plurality of the receivers storing similar data on each receiver in the subset, the similar data being provided to each receiver in the subset via the satellite broadcast system, and the data comprising a selected program chosen at the first receiver.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout:

FIG. 4 illustrates an example of usage of push data and peer-to-peer seeding data delivery times and rates in a system in accordance with one or more embodiments of the present invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention enables a satellite broadcast system (e.g., DIRECTV) consumer's home to be more efficiently served when the satellite receiver (also referred to as the IRD) is also coupled to a broadband internet connection.

The present invention enables the delivery of digital video, audio and other content to consumer homes in a highly cost effective and efficient manner as an alternative to a traditional content delivery network (CDN) that serves up content directly to users on a point-to-point basis. By using the enormous one-way capacity over a broadcast satellite that is already connected to millions of devices containing local storage controlled by the operator (e.g., DIRECTV), excellent seeding and formation of a peer-to-peer network is accomplished through the present invention for essentially no cost. The distribution of such content to additional users as they need the content can be made using the consumers' broadband connections in such a manner that the neither the broadband connection nor television viewing experience are impacted, and no data transmission costs are incurred by the operator.

The present invention works with consumer satellite set top boxes (e.g., IRDs 112, and/or IRDs 112 with DVR capabilities) that are connected to a broadband internet connection 200, regardless of what type of connection it is (DSL, fiber, satellite, etc.).

Figure 1:
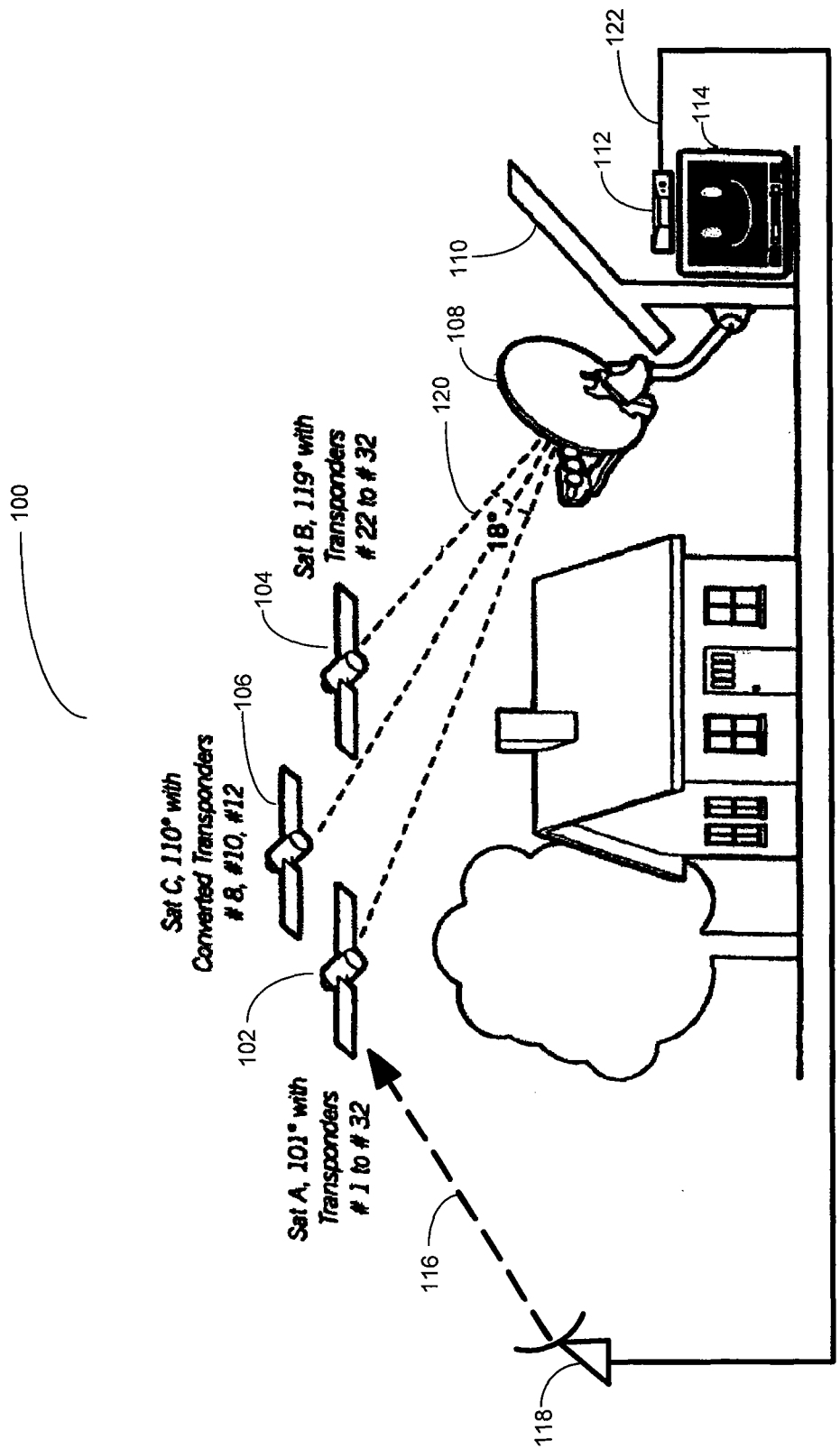
FIG. 1 illustrates a typical satellite television installation of the related art.
Figure 2:
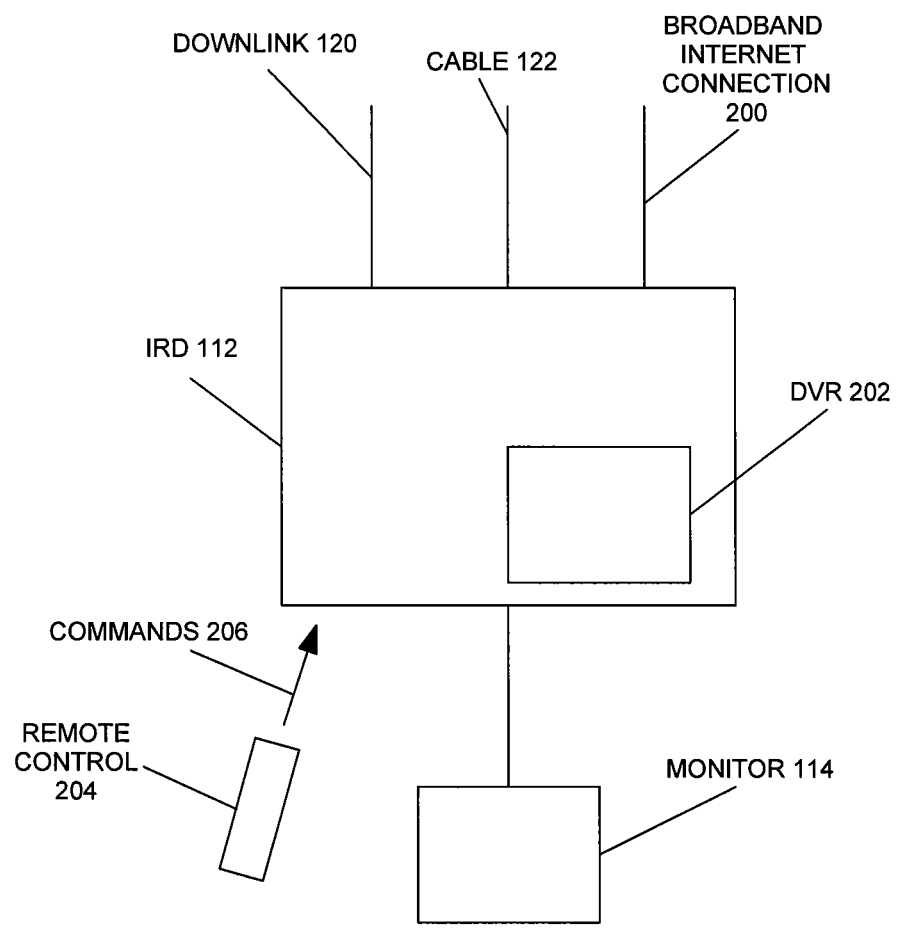
FIG. 2 illustrates a typical IRD of the related art.
Figure 3:
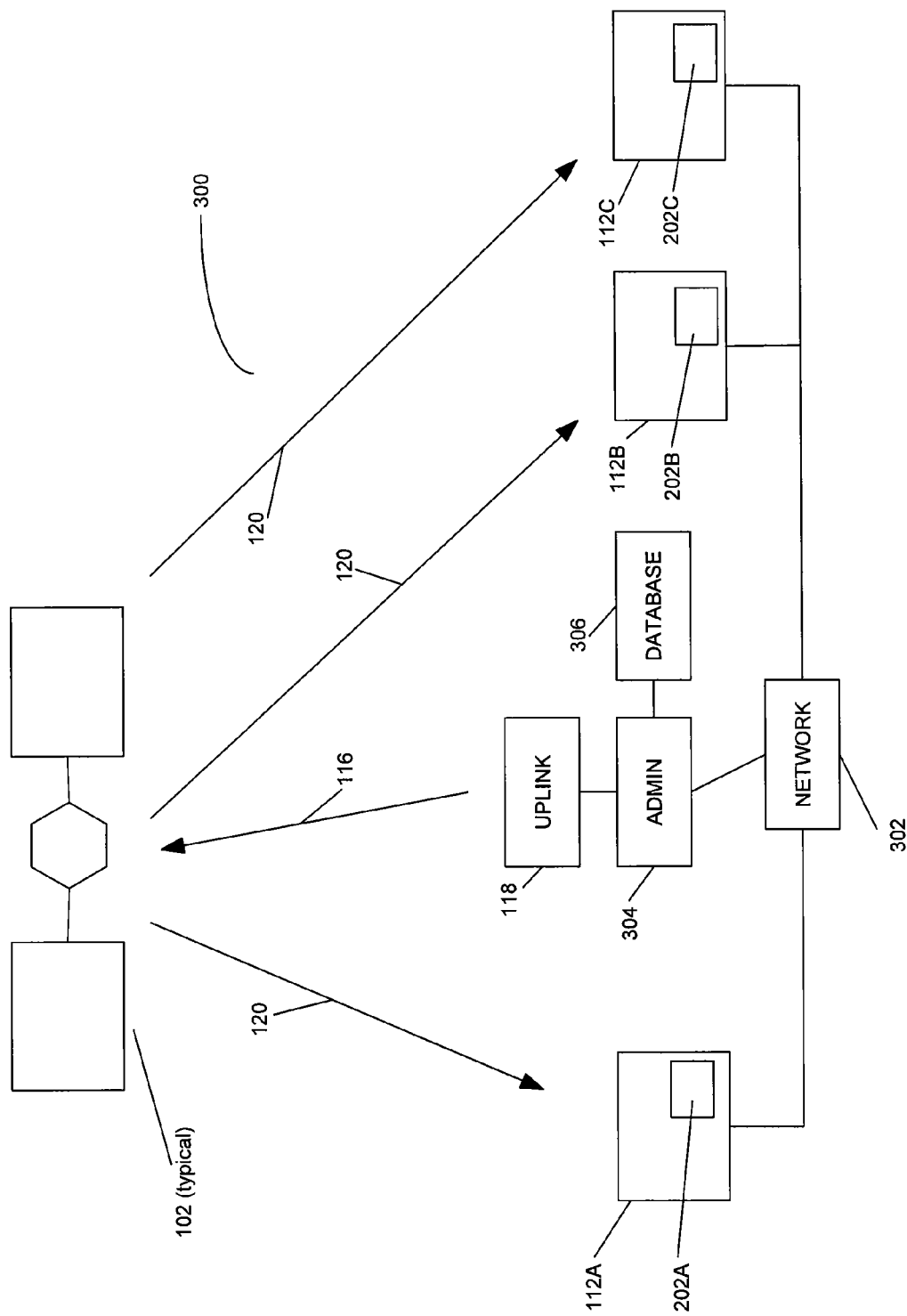
FIG. 3 illustrates a network in accordance with one or more embodiments of the present invention.

FIG. 3 illustrates a system in accordance with one or more embodiments of the present invention.

System 300 illustrates a satellite delivery system, with satellite 102 as a typical content delivery vehicle, although additional satellites 102-106 can be used without departing from the scope of the present invention.

Downlink signals 120 are delivered to a plurality of IRDs 112, and, for sake of differentiation in the present discussion, IRDs 112 are referred to as IRD 112A, 112B, and 112C as shown in FIG. 3. Similarly, IRDs 112A-C may comprise DVRs 202, which are also referred to as DVR 202A, 202B, and 202C to correspond to IRDs 112A, 112B, and 112C for ease of discussion purposes. No limitation on the present invention is implied or expressed through the discussion presented herein.

Each of IRDs 112A-C are further coupled to broadband internet connection 200, which connect to network 302. Network 302 is typically the internet, but can also be a private network or other network without departing from the scope of the present invention. Further, rather than using broadband internet connection 200, other connections, such as cable 122, can be used to pass data as described herein without departing from the scope of the present invention.

As part of system 300, content to individual IRDs 112A-C is typically delivered via satellite 102, but can also be delivered to IRDs 112A-C via connection 200. To deliver content to individual IRDs 112A-C, administrator 304 is coupled to network 302, and also coupled to transmission station 118, such that content requested by individual IRDs 112A-C can be delivered via either satellite downlink 120, network 200, some other delivery channel, or some combination of delivery channels. Prior to the present invention, however, the delivery of content was delivered from database 306. Database 306 is typically populated with content for specific channels of programming, whether pay-per-view or continuous viewing channels (e.g., local television stations, specialty channels such as sports and/or public access channels, etc.), or other restricted viewing channels (e.g., channel packages, adult programming, etc.). The present invention provides an administrative method to allow peer-to-peer delivery of content through network 302; for example, IRD 112A, with content stored on DVR 202A, can deliver content to IRD 112B, to either be viewed immediately through IRD 112B or stored on DVR 202B. Further, a single IRD 112A can deliver content to multiple other IRDs 112B and 112C, or multiple IRDs 112B and 112C can send content to IRD 112A, in the same fashion.

Administrator 304 has access to the data and trends that each IRD 112 in system 300 has experienced. For example, and not by way of limitation, Administrator 304 has data that shows IRD 112A has been sent a pay-per-view movie, "Movie A," which was pushed as content to DVR 202A via network 302 and/or downlink 120, and the user that controls IRD 112A has not yet attempted to view Movie A from DVR 202A. At a certain point in time, administrator 304 will no longer send the content from Movie A via downlink 120, or via network 302, as Movie A may not have been a popular movie or other events have occurred to utilize bandwidth in downlink 120. As such, should the user controlling IRD 112B wish to see Movie A, that data content may not be readily available, or available at all, in system 300.

The present invention provides control to administrator 304 over DVR 202A in such a fashion that DVR 202A sends the data content of Movie A via network 302 to IRD 112B. Similarly, if there were data on DVR 202B, administrator 304 could send that data to DVR 202A, and/or other DVRs 202 in system 300.

Further, to increase system 300 security and integrity, each DVR 202 may only store a portion of the data for Movie A, and that a request from a specific IRD 112, e.g., IRD 112B, would trigger administrator 304 to send commands to each of the IRDs 112 that are storing the portion of the data to forward that data to IRD 112B. Such data forwarding may be in a serial or parallel fashion, and may comprise additional encoding such that only IRD 112B would be able to decode or receive the data.

As such, each IRD 112, especially those IRDs 112 comprising a DVR 202, acts as a data repository, or "seed" for a content delivery network. The system provider, through administrator 304, not only provides access to the data repository database 306, but also provides selective access for subscribers to data stored on other subscriber's DVRs 202, such that more efficient and cost-effective delivery of content data is achieved within system 300.

The content may be stored as an entire program/movie/episode on each seed device (i.e., DVR 202), or may be stored as only a portion of the file in order to increase security and content protection integrity. The content is envisioned to be stored with broadcast conditional access encryption, although other means may be utilized without violation of this concept.

The content that benefits most from being delivered by this means includes movies, television episodes, music, photos, software, and any other digital content that might otherwise become burdensome to be carried over the internet to many end points when an expense is incurred per unit of content delivered. Low data rate unique content (email, messaging, etc.) typically would not benefit from such an architecture since it is destined for a single or low quantity of users; however, such a system 300 architecture can also support such data delivery. However, for very high demand content (recent hit movies, etc.), copies or portions of the data content could be delivered via satellite downlink 120 to every IRD 112 with a DVR 202, which may alleviate the use of network 302 peer-to-peer distribution; peer-to-peer distribution would not be unavailable in such situations, merely less effective than the higher bandwidth delivery via downlink 120.

An example of this invention would be the desire to create a low/no-cost CDN that contains 7,000 hours of standard and high definition video content in 3,500 titles of 2-hours each occupying a total of 6.1 TeraBytes. A data storage facility 306 of such a size would be physically possible, however, the network access of a single pipeline for that database 306 would likely be difficult to maintain and/or operate without use of the satellite downlink 120. However, if an initial peer-to-peer network system 300 were set up in accordance with one or more embodiments of the present invention, with a minimum of 50 seed copies of content across 20,000 DVRs 202 (seed devices), the required storage space per DVR 202 (seed) would only be 15 Gbytes. Such a system 300 becomes even more feasible as the DVR (seed) population grows from 20,000, freeing database 306 storage for other data and/or additional titles/data content. Of course, if there are more seeds, e.g., 400,000 DVRs 202 coupled to the network 302, and perhaps only 25 copies of each seed are needed, the amount of storage per DVR 202 would be lower than in the example provided.

System provider, via administrator 304, also can track other data, e.g., billing data, as IRDs 112 utilize network 302 for the peer-to-peer network usage by individual IRDs. For example, and not by way of limitation, if IRD 112A requests a movie that is available via downlink 120, and also available via network 302, administrator 304 can provide the requested movie via a predetermined method, or can ask the user of IRD 112A if they would like to pay a first price (e.g., $4.99) for a downlink 120 delivery, or a second price (e.g., $2.99) for a network 302 delivery of the requested movie. Some users may wish to have the requested movie immediately, and may wish to pay for a downlink 120 delivery.

Other users may wish to pay the lower price for a delivery via network 302, as those users may not be immediately viewing their monitor 114 or setting a recording on their DVR for later viewing of the requested movie.

FIG. 4 illustrates an example of usage of push data and peer-to-peer seeding data delivery times and rates in a system in accordance with one or more embodiments of the present invention.

Table 400 shows one configuration of a joint push-data/peer-to-peer seeding embodiment in accordance with one or more embodiments of the present invention. For example, as discussed above, a 20,000 seed (DVR 202) system 300, with 50 seeds per title in a 3500 title content delivery system, would only require 15 GB of storage per DVR 202. This can be used in conjunction with push data at various push and carousel periods, e.g., 2 copies every 7 days of push data, 1 copy per 24/48/96 hours of carousel data, etc. as shown, to deliver various program titles to IRDs 112. In the example, where it takes 19 Mbps to seed the peer-to-peer network for 3500 titles as compared to 172 Mbps to provide the first 2475 titles in a carousel/push environment, it can be seen that the peer-to-peer network is more efficient, and, further, the peer-to-peer approach can also be used in conjunction with the carousel/push concepts. However, there are some IRDs 112 that do not have or are not connected to a broadband 200 connection; to allow these IRDs 112 to continue to receive additional programming, thus, the carousel/push concepts can remain in place in system 100 for use with these and all IRDs as a data delivery technique.

Figure 5:
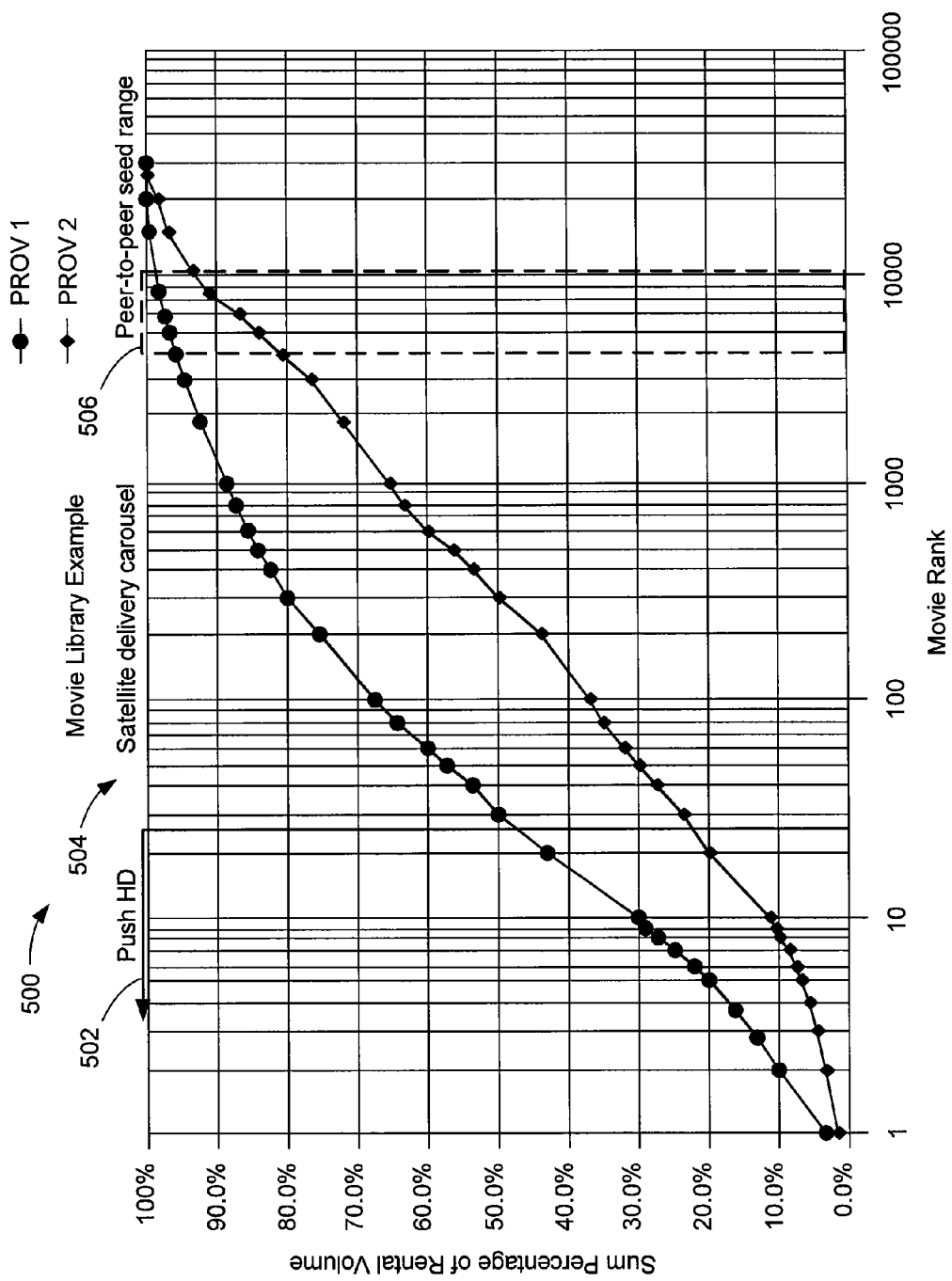
FIG. 5 illustrates a comparison between movie usage and peer-to-peer deliveries of data.

FIG. 5 illustrates a comparison between movie usage and peer-to-peer deliveries of data.

As a comparison between various movie library usage deliveries of movie content and the present invention, graph 500 shows provider 1 (top line) and provider 2 (bottom line) deliveries of movies as a percentage of movie delivery volume (on the y-axis) and the popularity rank of the movie (on the x-axis). Area 502 is the satellite system delivery of such content via push techniques; such techniques would typically only be able to deliver 10-20 movies that are the most popular to various satellite subscribers. Area 504 illustrates that use of a satellite delivery carousel would allow for delivery of more movie data, typically perhaps the top 2000 movies (again, with data delivery issues becoming more prevalent as described in FIG. 4). However, with the present invention, range 506 shows that approximately the top 10,000 movies can now be delivered, which ranks equivalent to or better than a typical content provider in terms of delivery of the requested movie for a given provider. Further, the satellite system 300 user would merely have to press buttons on remote control 204 to have such content delivered, rather than wait for an alternative delivery of the same content (e.g., visit a store to purchase/rent movie, etc.).

Process Chart

Figure 6:
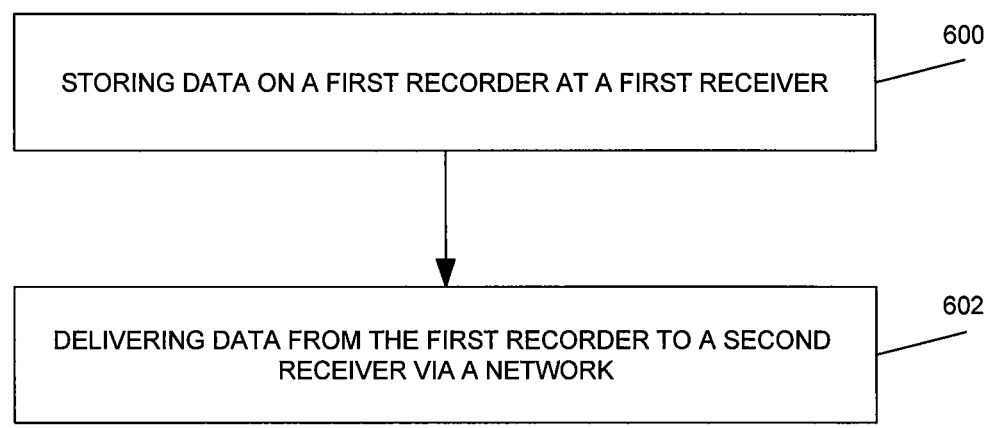
FIG. 6 illustrates a process chart in accordance with one or more embodiments of the present invention.

FIG. 6 illustrates a process chart in accordance with one or more embodiments of the present invention.

Box 600 illustrates storing data on a first recorder at a first receiver.

Box 602 illustrates delivering data from the first recorder to a second receiver via a network.

CONCLUSION

Although described with respect to DVR 202A storing data and delivering data to IRD 112B having a DVR 202B, IRD 112B is not required to have a DVR 202B for the present invention to operate. For example, if DVR 202A is not being used, and administrator 306 has additional data regarding DVR 202A such that DVR 202A can provide the requested data to IRD 112B without otherwise interrupting use of IRD 112A and/or DVR 202A, then DVR 202A can deliver data directly to IRD 112B without the need for IRD 112B to record the requested data on DVR 202B. As such, although such a system is more efficient when a larger number of IRDs 112 have DVRs 202, each IRD 112 does not require a DVR 202. Further, such usage may allow administrator 304, as part of the system provider, to charge a different rate for data delivery to IRDs 112 that do not have DVRs 202 than to those IRDs 112 that comprise a DVR 202. In addition, IRDs 112 that comprise a DVR 202 may receive a discount from the service provider, or a credit from the service provider, if the IRD 112 has different interrupt priorities or allows administrator 304 to use a larger portion of DVR 202 for storage of data.

The present invention comprises systems and methods for combining a satellite broadcast system with a network. A system in accordance with one or more embodiments of the present invention comprises a plurality of satellite receivers, wherein each of the satellite receivers is coupled to both the satellite broadcast system and the network, wherein a first receiver in the plurality of satellite receivers receives data from a second receiver in the plurality of receivers via the network.

Such a system further optionally comprises the network being a broadband network, the second receiver in the plurality of satellite receivers comprising a recorder, the first receiver in the plurality of satellite receivers comprising a recorder, the first receiver in the plurality of satellite receivers recording the data received from the second receiver, the first receiver in the plurality of satellite receivers further receiving additional data from at least a third receiver in the plurality of receivers via the network, the data and the additional data being portions of a single data program, a subset of the plurality of the receivers storing similar data on each receiver in the subset, the similar data being provided to each receiver in the subset via the satellite broadcast system, and the data comprising a selected program chosen at the first receiver.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. In a system comprising an administrator controlling the transmission of a plurality of media programs of a media program library via push transmission via a broadcast network, carousel transmission via the broadcast network, and peer transmission via a point to point network of a plurality of receiver peers, the media program having a plurality of portions, a method transmitting at least a subset of a plurality of media programs in a media program library to at least a subset of the plurality of receivers, comprising the steps of:
   determining a usage popularity of the media program among a plurality of media programs of the media program library of the broadcast network;
   selecting, according to the determined usage popularity, a first transmission method for transmitting a first media program to a first receiver of the plurality of receivers, the transmission method selected push transmission via the broadcast network;
   selecting, according to the determined usage popularity, a second transmission method for transmitting a second media program to a second receiver of the plurality of receivers, the second transmission method selected as carousel transmission via the broadcast network;
   selecting, according to the determined usage popularity, a third transmission method for transmitting a third media program to a third receiver of the plurality of receivers, the third transmission method selected as peer transmission via the point to point transmission network;
   transmitting at least one portion of the first media program by push transmission to the first receiver via the broadcast network;
   transmitting at least one portion of the second media program by carousel transmission to the second receiver via the broadcast network;
   commanding storage of the at least one portion of the third media program in a fourth receiver, the fourth receiver being one of a plurality of receiver peers including the third receiver, wherein the at least one portion of the media program is received via the broadcast network and stored at the direction of the administrator without request by the fourth receiver of the plurality of receiver peers;
   receiving, in the administrator, a request for the third media program from the third receiver; and
   transmitting a command from the administrator to the fourth receiver of the plurality of receiver peers in response to the received request, the command to transmit, via the point to point transmission network, the at least one portion of the third media program from the fourth receiver of the plurality of receiver peers to the third receiver.

2. The method of claim 1, wherein the third media program, including all the plurality of portions of the third media program is broadcast encrypted.

3. The method of claim 2, wherein the at least one portion of the third media program portion is further encoded for decoding by only the third receiver.

4. The method of claim 1, further comprising:
   providing options to a user of the third receiver whether to receive requested media program via the broadcast network, from the fourth receiver of the plurality of receiver peers via the point to point communications network, or combination of the broadcast network and from the fourth receiver of the plurality of receiver peers via the point to point communications network;
   accepting an option choice from the third receiver; and
   commanding the broadcast network and the fourth receiver of the plurality of receiver peers in the point to point transmission network to transmit associated media program portions according to the accepted option choice.

5. The method of claim 4, wherein the options are each associated with a different price.

6. The method of claim 1, wherein the at least one portion of the third media program portion and other media program portions of the third media program are transmitted serially, and for immediate viewing by the third receiver.

7. The method of claim 1, comprising the step of transmitting further commands from the administrator to other receiver peers of the plurality of receiver peers to transmit other portions of the third media program to the third receiver.

8. The method of claim 1, comprising the step of transmitting a further command from the administrator to the broadcast network, to transmit at least some of other portions of the third media program via the broadcast network.

9. The method of claim 1, wherein the at least one portion of the third media program and at least some of other portions of the third media program are transmitted in parallel.

10. The method of claim 1, wherein the command to transmit, via the point to point transmission network the at least one portion of the third media program from the fourth receiver of the plurality of receiver peers to the third receiver further comprises a command to transmit, via the point to point transmission network, the at least one portion of the third media program from the fourth receiver of the plurality of receiver pairs to another receiver of the plurality of receiver pairs.

11. The method of claim 1, wherein the usage popularity of the media program describes a popularity of viewing the media program using the plurality of receivers compared to viewing of other of the plurality of media programs in the media program library.

12. The method of claim 11, wherein the usage popularity is determined at least in part from data describing user views of the media program by at least a portion of the plurality of receivers.

13. The method of claim 11, further comprising:
receiving, in the administrator, data describing the user views of at least a portion of the plurality of media programs in the media program library from at least a portion of the plurality of receivers; and
determining, in the administrator, the usage popularity of the media program from the received data.

14. The method of claim 13, wherein the data comprises user commands to view the at least a portion of the plurality of media programs.

* * * * *